Nov. 6, 1962 T. A. RIEHL 3,062,696
PNEUMATIC TIRES
Filed April 23, 1956

INVENTOR.
THEODORE A. RIEHL
BY
R. L. Miller
ATTORNEY

United States Patent Office 3,062,696
Patented Nov. 6, 1962

3,062,696
PNEUMATIC TIRES
Theodore A. Riehl, Akron, Ohio, assignor to The Goodyear Tire & Rubber Company, Akron, Ohio, a corporation of Ohio
Filed Apr. 23, 1956, Ser. No. 579,875
6 Claims. (Cl. 156—128)

This invention relates to the fabrication of pneumatic tires having improved resistance to groove cracking and is particularly concerned with a process for treating unvulcanized treads as well as vulcanized tires.

Increases in the production of automobiles and other transportation vehicles have made large inventories of pneumatic tires mandatory. These tires may be stored in mounted condition as part of a stored vehicle, or they may be stored in an unmounted condition. In either event, pneumatic tires, both in storage and in use, are subjected to various factors which cause groove cracking. Groove cracking is the opening of small fissures within the depressed tread area of the road-contacting portion of a tire and is believed to result from the introduction of oxygen and/or ozone into rubber molecules which in turn causes a hardening of the exposed area of the rubber. This hardened surface tends to crack or fissure which permits oxygen and/or ozone from the atmosphere to penetrate deeper into the rubber composition where further hardening and subsequent cracking result, with the ultimate development of a potentially dangerous condition in the tire structure. As expected, groove cracking is accelerated when the rubber is under tension or compression. For example, when stored automobiles are allowed to rest upon mounted tires, static tension is created, and when tires are in operation on a moving vehicle, dynamic tension is produced.

Many efforts have been directed toward alleviating this serious problem which magnifies as the size of the tire is increased. For example, various devices have been used to attempt to relieve the stresses and strains created within the grooves during the curing process. This has been done by treating the grooves with heat of one form or another. This is objectionable because it requires a separate operation. Also, it is known to insert soft rubber plugs in unvulcanized treads, often referred to as green treads, prior to tire construction, but this is open to the objection that due to the flow of rubber when the tires are molded and cured the location of the soft plugs cannot be controlled to coincide with the grooves in the tread, and soft rubber in the raised portions of the tread, e.g. buttons or ribs, causes uneven wear. In addition, it is known to coat vulcanized articles with unvulcanized elastomeric compositions. However, this is not a satisfactory method for preventing groove cracking in tires because the elastomers tend to strip from the road-contacting area of the tire due to constant flexing and heat buildup.

It is an object of this invention to construct a pneumatic tire which is resistant to groove cracking.

It is another object of this invention to fabricate a tire according to a process whereby the tire is rendered resistant to groove cracking.

The objects of this invention are accomplished by coating that portion of a freshly prepared unvulcanized tire tread which corresponds to the ultimate road-contacting area of the tire with a tenaciously adherable, elastomeric composition and subsequently co-curing the coating and tire.

The elastomeric compositions are applied to the treads in the form of cements which are made by dissolving the rubbery materials in suitable solvents.

Various elastomeric compositions are useful in the practice of this invention, either alone, admixed with each other or admixed with other rubbery compositions. For example, the ozone resistant elastomeric materials such as the various neoprenes (polychloroprenes), and the reaction products of aliphatic mono-mercaptans and polymers of conjugated diolefins are useful in the practice to this invention.

Neoprene is a rubbery polymer of a 2-chlorobutadiene-1,3, commonly known as polychloroprene, or rubbery polymers of 2,3-dichlorobutadiene-1,3 or rubbery copolymers of a chlorobutadiene-1,3 with monomers copolymerizable therewith, such as isoprene, butadiene-1,3, styrene, acrylonitrile, etc. The typical neoprenes are known to the trade as "GN," "KN," "I," "GR–M," "AC," "CG," "GR–M–10" and others.

The elastomeric reaction products of aliphatic monomercaptans and polymers of conjugated diolefins which are useful in the practice of this invention are the new synthetic rubbers made by reacting at least one aliphatic mono-mercaptan containing from 1 to 6 carbon atoms, such as methyl mercaptan, with at least one synthetic rubber latex containing a polymer selected from the group consisting of emulsion-polymerized conjugated diolefins containing from 4 to 6 carbon atoms, such as polybutadiene, and emulsion-polymerized copolymers of at least one conjugated diolefin containing from 4 to 6 carbon atoms with up to an equal amount by weight of at least one monomer containing a reactive component selected from the group consisting of vinyl and vinylidene radicals polymerizable with said diolefin, the double bonds present in said polymer being saturated by reaction with the mercaptan to the extent of at least 30% of the total double bonds present in said polymer, the mercaptan/polymer addition product having a Mooney plasticity, as measured by the large rotor at 212° F. of not less than 35. The addition product may be used either alone or in combination with natural rubber, reclaimed rubber, the rubbery copolymers of butadiene and styrene, the rubbery copolymers of butadiene and acrylonitrile, the rubbery polymers of 2-chlorobutadiene-1,3, or mixtures of these in the fabrication of rubber products.

The latices useful in preparing the addition products of this invention include those rubber latices formed by the emulsion polymerization of conjugated diolefins containing from 4 to 6 carbon atoms, examples of which are butadiene, isoprene, dimethyl butadiene, methyl pentadiene, piperylene, and halogen-substituted derivatives of these dienes, such as 2-chlorobutadiene-1,3. These conjugated diolefins may be polymerized alone to form polymerized homopolymers or as mixtures to form polymerized interpolymers. In addition to the polymerized conjugated diolefins, other latices which may be used in preparing the addition products of this invention are the copolymers of the conjugated diolefins with up to an equal amount by weight of a monomer having a vinyl or vinylidene group polymerizable with the diolefin. Examples of these polymerizable monomers are styrene and its ring-substituted alkyl, alkoxy and halogen derivatives such as para methyl styrene, ortho-para dimethyl styrene, para methoxy styrene, and the chloro or bromo styrenes; the alpha substituted styrenes such as alpha methyl styrene and alpha-para dimethyl styrene; acrylic and methacrylic acids and their esters such as methyl or ethyl acrylate and methyl or ethyl methacrylate; and vinyl pyridines and their ring substituted alkyl derivatives such as 2-vinyl pyridine and 2-methyl 5-vinyl pyridine; vinylidene chloride; acrylonitrile and its alpha-alkyl and halogen substituted derivatives such as methacrylonitrile. Specific examples of these copolymers are the copolymers of butadiene and styrene and the copolymers of butadiene and acrylonitrile. Copolymers formed with more than 50% by weight of the copolymerizable monomer containing the vinyl or vinylidene group are not included in the preparation of the addition products of this invention since these copolymers do not possess the desired rubber-like properties.

The latices of the polymers used in preparing the addition products of this invention are themselves prepared by methods well known in the production of synthetic rubber, and may be either the so-called "hot rubber" latices or "cold rubber" latices. In preparing a "hot rubber" latex the conjugated diolefin, with or without the polymerizable monomer, is emulsified in about twice the total monomer weight of water, using about 1% to 6% by weight of the total monomers of suitable emulsifying agents such as ammonium or alkali metal salts of fatty or rosin acids, examples of which are stearic, palmitic, oleic, hydrogenated tallow acids or hydrogenated rosin acids. Synthetic emulsifiers including alkali metal salts of alkyl aryl sulfonic acids such as the sodium salts of alkylated benzene or naphthalene sulfonic acids and alkali metal salts of fatty alcohol sulfates such as sodium lauryl sulfate may also be used. To promote or accelerate the polymerization of the monomers, from 0.1% to 0.5% by weight of the monomers, of a catalyst is incorporated into the mixture. The catalyst generally used in the preparation of "hot rubber" is potassium persulfate. However, such catalysts as alkali metal salts of perborates, benzoyl peroxide or hydrogen peroxide may also be used. A mercaptan is usually employed in amounts of from 0.1% to 1.0% by weight based on the monomers to terminate the polymerized chains of the molecules and thereby control the weight and configuration of the polymer molecules as they form. Suitable modifiers include aliphatic primary and tertiary mercaptans containing at least 6 carbon atoms per molecule such as octyl, dodecyl, hexadecyl, octadecyl and benzyl mercaptan. In preparing "hot rubber" latex the reaction mixture is maintained at about 122° F. until about 70% of the monomers are converted into polymer. Some of the more volatile unreacted monomers are vented off by lowering the pressure over the reaction mixture. Any remaining monomer is then removed by steam stripping, vacuum distillation, or by passing an inert gas such as nitrogen through the latex.

In preparing so-called "cold rubber" latices, the same general procedure is used as that described for the preparation of "hot rubber" latex except that a lower reaction temperature (in the range of from 41 to 55° F.) is maintained. For this reason a more active catalyst system must be employed in preparing "cold rubber," if comparable reaction rates are to be maintained. In "cold rubber" formulations several catalyst systems are known which provide satisfactory reaction rates among these being a mixture of sodium formaldehyde sulfoxylate, an organic hydroperoxide and an iron salt; a mixture of a polyethylene polyamine, an iron salt and an organic hydroperoxide; a mixture of an iron-pyrophosphate complex and an organic hydroperoxide; or a mixture of an iron-ethylenediamine tetraacetic acid complex and an organic hydroperoxide. In other respects the procedure for preparing "cold rubber" is the same as that used for producing "hot rubber."

As indicated above, the use of aliphatic mercaptans in polymerization reactions as chain transfer agents is well known. For this purpose relatively small amounts (from 0.1 to 1%) of mercaptans containing at least 6 carbon atoms are usually employed since lower molecular weight mercaptans appear to inhibit the polymerization reaction and are consumed rapidly in forming very short chains, so that the desired degree of polymerization is prevented. The function of the mercaptan in this polymerization reaction is to chain-terminate the polymerized molecules so as to control the molecular weight of the polymer.

The mercaptans used in preparing the addition products of this invention are the aliphatic mono-mercaptans containing from 1 to 6 carbon atoms per molecule. Mercaptans falling within this definition are the methyl, ethyl, propyl, isopropyl, butyl, isobutyl, amyl, isoamyl, and hexyl mercaptans, as well as other secondary or tertiary mercaptans containing the indicated number of carbon atoms per molecule. The mercaptan or mixtures thereof are usually provided in an amount up to 100% in excess of the amount theoretically required to furnish the desired degree of saturation in the addition product.

It has now been found that a degree of saturation equivalent to reaction of the mercaptan with 30% or more of the double bonds of the polymer can be achieved without accompanying loss of the rubber-like character of the polymer and, indeed, with the production of a modified polymer which has substantially improved physical properties as compared to those of the unmodified base polymer. This higher degree of saturation without accompanying degradation of the polymer can be achieved by conducting the reaction in the absence of any substantial amounts of oxygen and in the presence of a catalyst system which produces free radicals capable of aiding in the polymerization of diolefins. By the absence of substantial amounts of oxygen is meant that no oxygen has been deliberately added to the reaction mixture whether in the form of oxygen gas, air or other gaseous mixture or in the form of compounds capable of yielding substantial amounts of oxygen under the conditions of reaction. However, oxygen from the air or other source, to the extent to which it may incidentally dissolve in the reaction mixture, appears to have no adverse effect upon the properties of the addition product.

The catalyst systems which have been found to be operative to produce the desired degree of saturation without accompanying degradation of the polymer include the organic azo compounds wherein the azo group is acyclic and bonded from both of the nitrogen atoms to carbon atoms which are aliphatic in character and at least one of which carbons is tertiary and in which one of the carbons bonded to said tertiary carbon atom has its remaining valences satisfied by oxygen and/or nitrogen. These catalysts and methods for their preparation are described in United States Patent 2,471,959. Particularly effective catalysts of this type are azodiisobutyronitrile having the formula

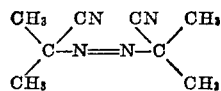

and dimethyl azoisobutyrate having the formula

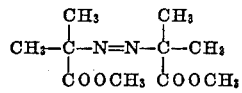

Other catalytic systems which may be employed are an organic hydroperoxide, such as cumene hydroperoxide and para-menthane hydroperoxide alone or in mixture with (1) sodium formaldehyde sulfoxylate and an iron salt, (2) a polyethylene polyamine and an iron salt, (3) an iron-ethylenediamine tetraacetic acid complex and (4) an iron-pyrophosphate complex. While the rate of addition of the mercaptan to the polymer depends in part upon the amount of catalyst used, it has been found that the reaction will take place in the presence of from 0.1 to 2 parts of catalyst to 100 parts of polymer in the reaction mixture.

In the preparation of the addition products of this invention the latex or mixtures of latices containing 15 to 60%, and preferably 20 to 35%, solids by weight are charged into a reaction vessel. Any residual air in the vapor space above the latex and in the latex itself is removed by evacuation. The catalyst and, in some cases, an emulsifier are then added. The mercaptan or mixtures thereof, provided in excess of the amount required to saturate the double bonds of the polymer in the latex to the desired level, are added. The excess can vary up to 100% of the amount required. Although the reaction will proceed at room temperature and even at temperatures below room temperature, it has been found expedient to heat the reaction mixture to from 45 to 90° C. and preferably from 50 to 65° C. The time of reaction required to achieve a selected level of saturation will depend upon the particular reactants, the concentrations thereof, the amount of catalyst, the temperature of the reaction and the degree of saturation desired. In general, the reaction time will vary from 1 to 24 hours and, in certain cases, even longer.

After the desired degree of saturation has been reached, as determined by the increase in solids content of samples taken from the reaction mixture or by measurement of the residual mercaptan in an aliquot sample, the excess mercaptan is stripped from the reaction mixture. The addition product formed may be used as a latex to manufacture products which are presently fabricated from natural and synthetic rubber latex, or, if desired, the product may be isolated in the form of a thin sheet or film by spreading the reaction mixture onto a surface and drying. The addition product may also be collected in bulk form by depositing a continuous film of the latex on a drum or belt over which heated air is directed. The usual method of obtaining the addition product is by coagulating the latex and washing and drying the rubber product which is then in a form suitable for compounding and processing on rubber manufacturing equipment.

Of the addition products of this invention, among those preferred are the products prepared by the addition of the $C_1$ to $C_6$ mercaptans to polybutadiene and polyisoprene. Particularly interesting properties have been observed in the addition products of methyl or ethyl mercaptan and polybutadiene, the total double bonds of the polybutadiene being saturated to the extent of from 65% to 98%.

The elastomeric addition products which are useful in the practice of this invention are more fully set forth in Serial No. 543,360, filed on October 28, 1955.

The ozone resistant elastomeric materials which are useful in the practice of this invention are elastomeric materials which are more resistant to degradation from ozone than ordinary tire rubbers and are also more resistant to the effects of degradation due to oxygen. Also, they are normally more resistant to cracking from constant flexing than ordinary tire rubbers.

Customarily, the ozone resistant rubbery elastomers are prepared in the form of cements by dissolving them in suitable solvents prior to use. Any of the known solvents are useful for this purpose, either alone or in mixtures. For best results, the neoprenes, and the reaction products of aliphatic mono-mercaptans and polymers of conjugated diolefins are customarily dissolved in an aromatic solvent such as benzene, toluene, xylene, acetone, methyl ethyl ketone, cyclohexanone, etc.

While best results are obtained if the treads are coated soon after being extruded, non-fully equivalent results are obtained if the coating is completed at a later period but while the treads remain unvulcanized. If desired, the coatings can be applied to the treads of fabricated green tires any time prior to curing. When freshly tubed treads are coated, the treads may be partially cooled by water or other means prior to the coating process. However, it is essential that the treads be absolutely dry at the time the coating composition is added thereto, and it is desirable that the tread stock be warm. Preferably, the treads are coated within a few seconds after coming through the extruder, commonly referred to as a tuber. However, satisfactory results have been obtained when the elapsed time was as much as 30 minutes to an hour between the tubing step and the coating step, and improved tires can be made by coating the treads during the tire building process.

The invention will be more fully understood from the following detailed description when read in connection with the accompanying drawing, wherein.

Figure 1:
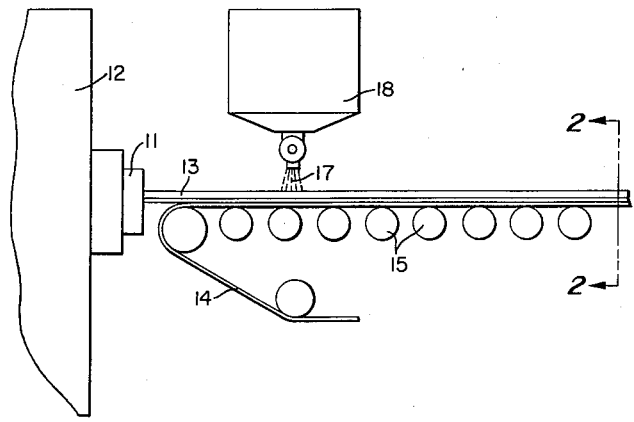
FIGURE 1 is a cross-section of one embodiment of the invention.
Figure 2:
FIGURE 2 is a cross-section of the unvulcanized tread taken along the lines 2—2 of FIGURE 1.
Figure 3:
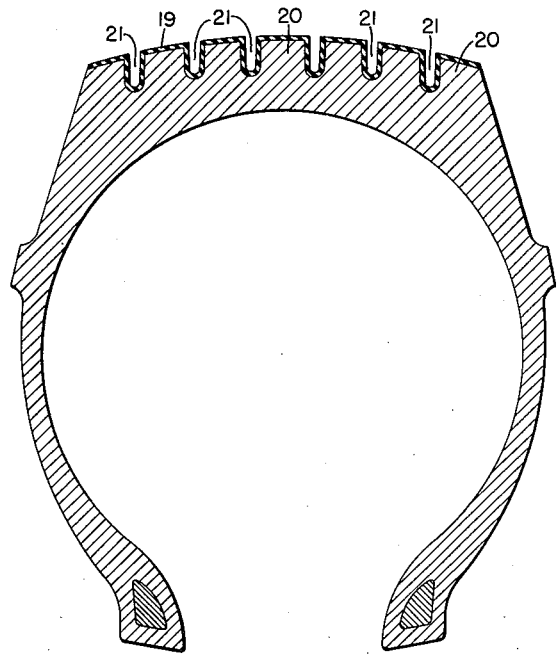
FIGURE 3 is a cross-section of a finished tire made according to the practice of this invention.

In the drawing, tread rubber is forced through a die 11 of a conventional extruder (tuber) 12 in order to fabricate a slab of tread stock 13 which is deposited onto a moving belt 14 which rides on driving and idling rollers 15. In customary practice, unvulcanized treads are extruded in a form similar to that disclosed in FIGURE 2 wherein it is shown that the upper surface 16 thereof, which will ultimately become the tread surface of the finished tire, is slightly concave and the outer areas diminish in thickness in order to provide stock for the shoulder area of the tire which will be produced. In the preferred practice of the invention, a cement 17, comprised of a rubber-like, elastomeric composition, dissolved in a solvent, is deposited onto the upper concave surface of the freshly extruded tread from a container 18. The cement is spread evenly over the upper concave surface of the tread so that the evaporation of the solvent leaves a uniform layer 19 deposited on the road-contacting area of the unvulcanized tread. Thereafter, the coated stock is cut into proper length for application to unvulcanized, green carcasses. The unvulcanized, finished tire is thereafter molded in a conventional curing press whereby the soft rubbery compositions of this invention form a continuous layer over the road-contacting ribs 20 and the indentations or grooves 21. In this manner, a tire can be fabricated which has greatly enhanced resistance to groove cracking.

Normally, these reaction products of aliphatic mono-mercaptans and polymers of conjugated diolefins and polychloroprenes remain elastomeric over large ranges of temperatures without the addition of compounding ingredients. If desired, customary compounding ingredients may be added. For example, they may contain curing agents such as sulfur, litharge, etc.; fillers such as carbon black, clays, etc.; plasticizers such as stearic acid, and the various process oils, etc.; accelerators such as the oxides of magnesium and zinc, aldehyde amines, mercapto benzothiazole, etc.; and antioxidants such as phenyl beta naphthylamine, alkylated phenols, etc.

In the practice of this invention, customarily compounded tread stocks containing reinforcing agents or fillers such as carbon black, plasticizers such as stearic acid and hydrocarbon oils and resins, curing agents such as sulfur, accelerators and antioxidants are masticated on a mill and thereafter passed through an extruder or tuber and cut to provide slabs of tread stock which will be attached to unvulcanized or green tire carcasses prepared in the customary manner by plying together layers of rubber coated fabric.

The elastomeric rubbery cements of this invention can be coated on the fresh tread stock in any convenient manner. For example, the cements may be brushed on, sprayed on, or poured on the road-contacting portion of the tread stock. It is essential that the cement be confined to the road-contacting area. If this is not done, coating compositions may get into the splices and cause tread separations in the finished tires. Preferably, the cement is poured onto the central concave portion of the freshly extruded or tubed tread stock and thereafter brushed evenly on the entire road-contacting area. In order to be certain that no cement gets onto the shoulder area, baffle plates can be conveniently used. After the cement is coated on the unvulcanized tread stock, the solvent is allowed to evaporate and thus leave a substantially non-tacky deposit of elastomeric composition thereon. This is necessary to insure that none of the soft composition gets into the splice area when the treads are cut.

In the practice of this invention, the cured elastomeric coating material, which is curved as a unitary part of the tire tread area, helps relieve the stresses created by dynamic and static tensions and helps prevent cracking because the coating has become a unitary part of the tread rubber. In fact, the plane of adhesion is comprised of an intermingled zone containing tread rubber and the elastomeric coating material. Because the coatings are very thin, that portion of the coating composition which is vulcanized to and covers the raised portions of the treads, e.g., the ribs or buttons, is soon worn away in service to expose the more abrasion-resistant rubber of the treads but leaving the coating composition in the grooves where it is tenaciously adhered to the base and sides of the grooves to provide relief from the stresses and where it forms an impervious barrier to the entrance of oxygen and ozone.

It has been discovered that best results are obtained by coating unvulcanized or green treads immediately after coming from the extruder or tuber and while the rubber is still quite warm from the mill breakdown prior to the extrusion and from passing through the extruder. In this manner, the coating composition readily adheres to the warm tread composition, and the warmth aids in evaporation of solvents from the coating system.

The coating which remains after evaporation of the solvent can range in thickness from about 0.001 of an inch up to about 0.020 of an inch. If the coating is thicker than 0.020, excessive tread wear results. The coating must be thin enough to not interfere with the function of the tire but thick enough to create an effective barrier. Preferably, the thickness of the film will range from about 0.005 of an inch to 0.010 of an inch.

After the tread stock has been coated with the cement and cut into tread lengths, the coated unvulcanized treads are applied to the prepared unvulcanized or green carcasses, and the tire is then cured in a conventional mold under conventional curing conditions. For example, the temperature normally will be at least 250° F., and it may go up as high as 300° F. when large tires are being cured. The time of curing will customarily be at least 20 minutes but may be as long as several hours, e.g., 7 hours, for the curing of large tires.

In the following examples, which are not intended to be limitations on this invention, green tires were constructed according to customary practices and using the customary materials. The tread portions were fabricated according to usual practices and were composed of mixtures of natural rubber and a rubbery copolymer of butadiene and styrene. The tread rubbers were compounded with carbon black, accelerators, curing agents and antioxidants according to usual practice.

*Example 1*

A coating cement was prepared by mixing together the following ingredients:

|  | Percent by weight |
|---|---|
| Neoprene | 10.65 |
| Zinc oxide | .12 |
| Extra light calcined magnesia | .18 |
| Channel black | 1.77 |
| Phenyl beta napthylamine | .22 |
| Stearic acid | .39 |
| Sodium acetate | .09 |
| Medium processing oil | .44 |
| Toluene | 86.14 |
|  | 100.00 |

This cement was used to coat the road-contacting area of several freshly tubed treads to a thickness of about 0.002 of an inch. These treads were thereafter applied to green tires from production. These tires, which were size 10:00X20, were thereafter cured in a standard mold at 275° F. temperature for 110 minutes. The vulcanized tires having the thin layer of neoprene vulcanized to the tread area were tested on a test vehicle under normal operating conditions. The results showed vast improvement over the uncoated tires were were operated on the test vehicle as a standard for comparison.

*Example 2*

A coating cement was prepared by mixing together the following ingredients:

|  | Parts |
|---|---|
| Rubber A [1] | 85.0 |
| Natural rubber (smoked sheet) | 15.0 |
| Sulfur | 1.0 |
| Zinc oxide | 3.0 |
| Carbon black | 30.0 |
| Pine tar | 5.0 |
| A mixture of phenyl beta naphthylamine and diphenyl-p-phenylene diamine | 1.0 |
| Stearic acid | 1.0 |
| Polymerized trimethyl dihydro quinoline | 1.5 |
| Mercapto benzothiazole | 1.5 |
| Diphenylguanidine | 0.4 |
|  | 144.4 |

[1] The reaction product of 100 parts of polybutadiene and 61.5 parts of methyl mercaptan reacted at a temperature of 122° F. to about 80% saturation.

Eighty-two and one half pounds of the stock were mixed with eight and one half pounds of ethyl hydroxy trimethyl ammonium hydroxide, and the mixture was dissolved in ninety and one half gallons of toluene to form a cement. This cement was used to coat the road-contacting area of several freshly tubed treads to a thickness of about 0.002 of an inch. These treads were thereafter applied to green tires from production. These tires, which were size 10:00X20, were thereafter cured in a standard mold at 275° F. temperature for 110 minutes. The vulcanized tires having the thin layer of rubber A vulcanized to the tread area were tested on a test vehicle under normal operating conditions. The results showed vast improvement over the uncoated tires which were operated on the test vehicle as a standard for comparison.

While certain representative embodiments and details have been shown for the purpose of illustrating the invention, it will be apparent to those skilled in this art that various changes and modifications may be made therein without departing from the spirit or scope of the invention.

I claim:
1. The process of preparing a vulcanized tire having a tread area which has enhanced resistance to groove cracking comprising (1) coating the road-contacting crown of a freshly tubed unvulcanized tread stock with a coating of a dilute cement of an uncured vulcanizable ozone-resistant elastomeric material, (2) allowing the solvent to evaporate from the cement coating to produce a thin layer of uncured vulcanizable ozone-resistant elastomeric material on the crown of the tread, (3) placing said treated tread stock on an unvulcanized tire carcass to provide a green tire and (4) thereafter curing said green tire in a mold having a tread design to produce a tread having grooves and raised anti-skid members.

2. The process of claim 1 wherein the ozone-resistant elastomeric material is at least one of the elastomeric addition products of (a) at least one aliphatic mono-mercaptan having from 1 to 6 carbon atoms and (b) at least one synthetic rubber latex containing an emulsion polymerized polymer of at least one conjugated diolefin having from 4 to 6 carbon atoms with from none to an equal amount by weight of at least one monomer containing a reactive component selected from the group consisting of vinyl and vinylidene radicals which are polymerizable with said diolefin, in which the double bonds present in the polymer are saturated by reaction with the mercaptan to the extent of at least 30% of the total double bonds present in said polymer, said addition product having a Mooney plasticity (large rotor) of not less than 35.

3. The process of claim 2 wherein the polymer of the elastomeric addition products is polymerized butadiene-1,3.

4. The process of claim 2 wherein the polymer of the elastomeric addition products is polymerized isoprene.

5. The process of preparing a tire having a tread area which has enhanced resistance to groove cracking, comprising (1) coating the road-contacting crown of a freshly tubed unvulcanized tread stock with a coating of a dilute cement of an uncured vulcanizable polychloroprene composition, (2) allowing the solvent to evaporate from the cement coating to produce a thin layer of uncured polychloroprene on the crown of the tread, (3) placing said treated tread stock on an unvulcanized tire carcass to provide a green tire and (4) thereafter curing said green tire in a mold having a tread design to produce a tread having grooves and raised anti-skid members.

6. The process of preparing a tire having a tread area which has enhanced resistance to groove cracking comprising (1) coating the road-contacting crown of a freshly tubed unvulcanized tread stock with a coating of a dilute cement containing approximately 86% toluene and approximately 14% of an uncured vulcanizable polychloroprene composition, (2) allowing the toluene to evaporate from the cement coating to produce a thin layer of uncured polychloroprene, approximately 0.002 of an inch in thickness on the crown of the tread, (3) placing said treated tread stock on an unvulcanized tire carcass to provide a green tire and thereafter curing said green tire in a mold having a tread design to produce a tread having grooves and raised anti-skid members.

References Cited in the file of this patent

UNITED STATES PATENTS

| | | |
|---|---|---|
| 1,719,628 | Sloman | July 2, 1929 |
| 2,274,855 | Wallace | Mar. 3, 1942 |
| 2,649,134 | Steinle | Aug. 18, 1953 |
| 2,672,909 | Hulswit | Mar. 23, 1954 |
| 2,710,042 | Gates | June 7, 1955 |
| 2,711,986 | Strain et al. | June 28, 1955 |
| 2,825,662 | McKay et al. | Mar. 4, 1958 |

OTHER REFERENCES

Du Pont Information Bulletin X–34, "Hypalon S2, Chlorosulfonated Polythene Protective Coatings for Rubber and Fabrics," 7 pages.